Oct. 31, 1944. A. C. CROSS 2,361,605
CULTIVATOR
Filed Aug. 27, 1943  2 Sheets-Sheet 2

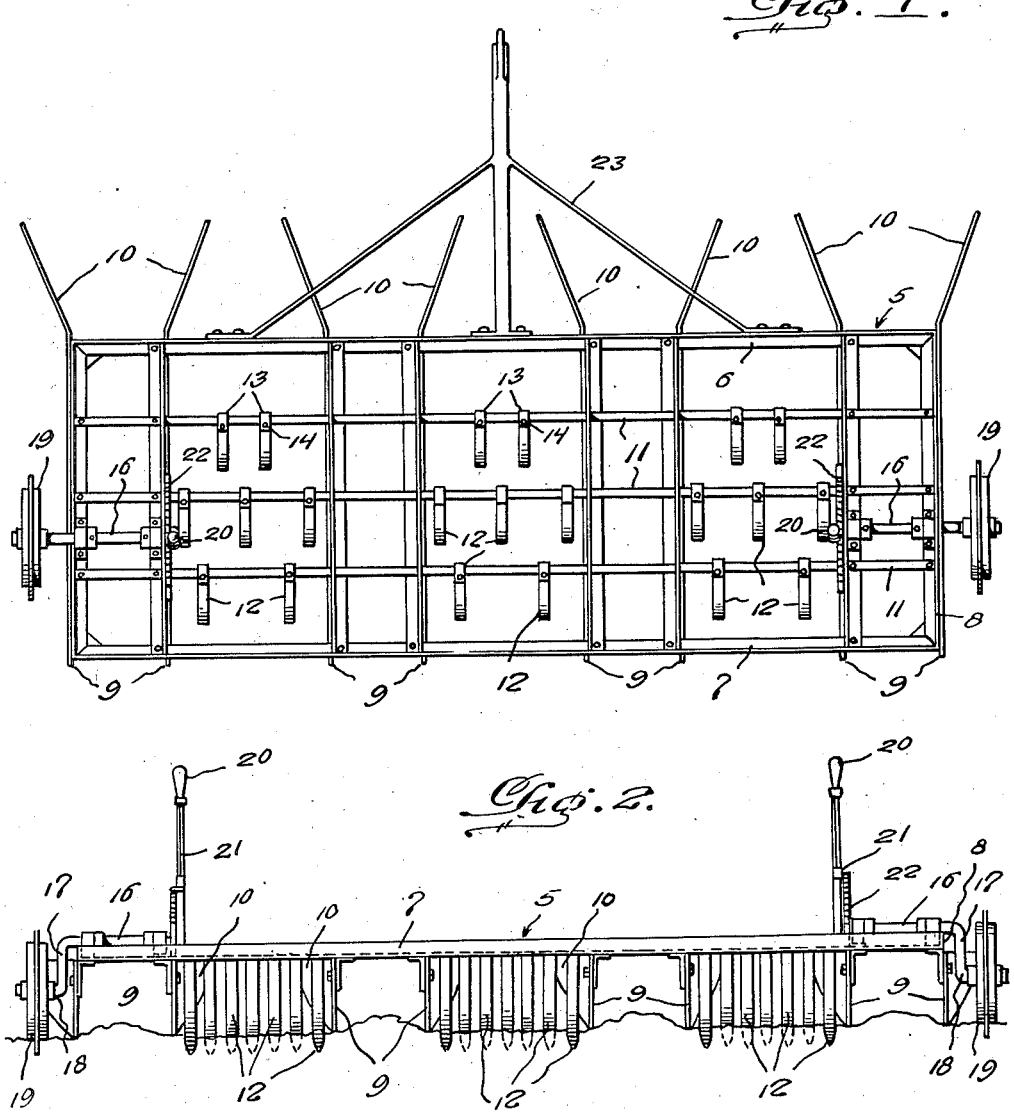

Inventor
Alvin C. Cross,
Attorneys

Patented Oct. 31, 1944

2,361,605

UNITED STATES PATENT OFFICE 2,361,605

CULTIVATOR

Alvin C. Cross, Lamar, Nebr.

Application August 27, 1943, Serial No. 500,263

4 Claims. (Cl. 97—192)

This invention relates to cultivators especially adapted for cultivating row crops whereby a plurality of rows of growing vegetation may be thoroughly and efficiently worked close to the roots without disturbing the latter and to work the soil between the rows to remove therefrom weeds and other undesirable growth.

The primary object of this invention is the provision of a device of the above stated character which is especially adapted for cultivating beans and other vegetation, wherein the vines or bushes thereof do not reach excessive heights but have a tendency to spread out between the rows, the device being so constructed as to gather the spreading vines or growth toward the roots to prevent the cultivating teeth from injuring the growth and still permit the soil between the rows close to the roots to be thoroughly worked. Means also is provided to regulate the depth at which the soil may be worked by the device.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a top plan view illustrating a cultivator constructed in accordance with my invention.

Figure 2 is a rear elevation illustrating the device.

Figure 3:
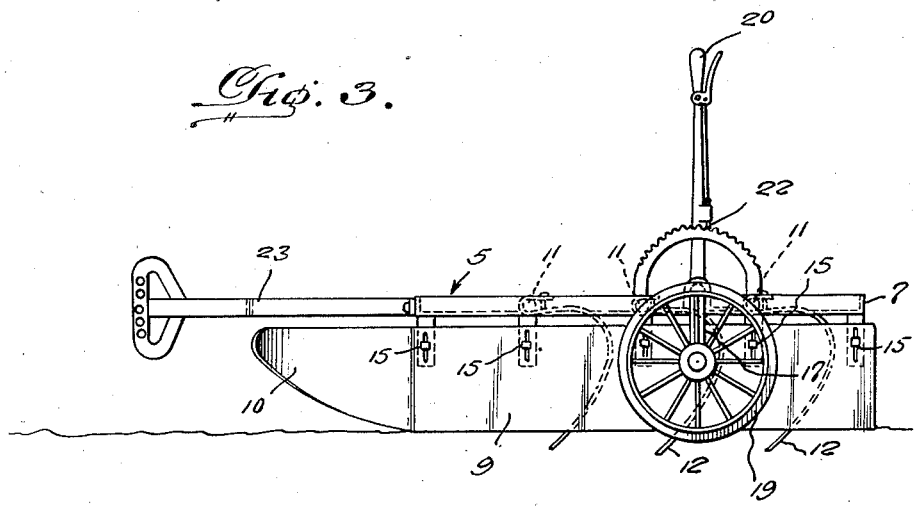
Figure 3 is a side elevation illustrating the device.
Figure 4:
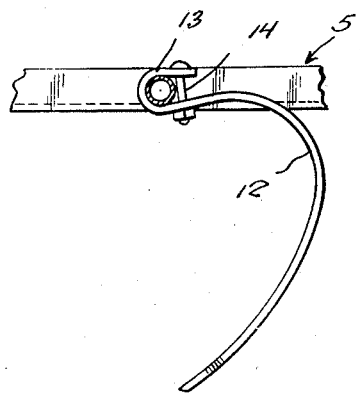
Figure 4 is a detail sectional view illustrating one of the cultivating teeth and the means of mounting the same on the cultivator frame.
Figure 5:
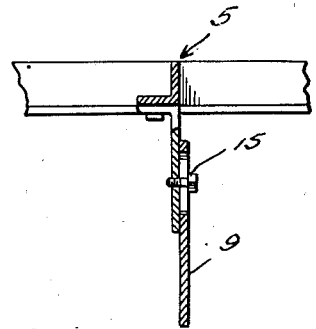
Figure 5 is a detail sectional view illustrating one of the guard plates and its connection with the cultivator frame.
Figure 6:
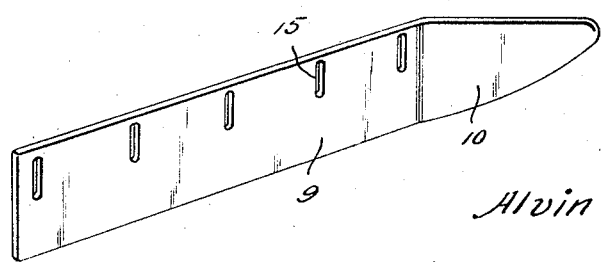
Figure 6 is a perspective view illustrating one of the guard plates.

Referring in detail to the drawings, the numeral 5 indicates a frame composed of parallel front and rear members 6 and 7 and end members 8. The members 6, 7 and 8 are preferably constructed of channel iron stock and suitably connected with each other to form a rigid and durable frame. The length of the frame is such as to take in a plurality of rows of crops and has secured thereto elongated guard plates 9 provided with diverging and tapered forward ends 10. The guard plates are grouped in pairs to operate at each side of rows of growing vegetation and the ends 10 thereof act as sweeps for gathering in spreading vines or growth.

Relatively spaced teeth carrying rods 11 are supported on the frame 5 and parallel the front and rear members and are arranged at right angles to the guard plates. Groups of cultivating teeth 12 are secured on the rods each being of the curved spring type. The teeth of each group are arranged in staggered relation so that no one of the teeth of each group of teeth tracks the other. The groups of teeth are arranged between the pairs of guard plates to act on the soil between the rows of growing vegetation and in close proximity to the roots of the vegetation. Each tooth 12 has its attached end bent into hook shape, as shown at 13, and equipped with a bolt 14 for clamping said hook shaped end on the rod.

The guard plates are mounted on the frame for vertical adjustment, as shown at 15. This adjustment permits the guard plates to be raised and lowered on the frame, the lower edges of the guard plates traveling upon the soil. Said adjustment of the guard plates will permit the device to be regulated so that the teeth will act in the soil at different depths.

Journaled on the frame and extending beyond the end members 8 thereof are axles 16 provided with drop portions 17 terminating in axle spindles 18 on which are journaled ground wheels 19 of the flange type to prevent side slip. The adjacent ends of the axles have secured thereto levers 20 provided with detents 21 coacting with quadrants 22 mounted on the frame whereby the axles may be manually rotated for the purpose of raising and lowering the frame with respect to the ground. This adjustment also will regulate the depth in which the teeth operate in the soil and may be employed for raising the teeth completely clear of the soil when the device is not in use.

The front member 6 of the frame has secured thereto a draft hitch 23 including a clevis so that the device may be conveniently coupled to a draft source or to draft animals, if desired.

In operation, the device is pulled forwardly with the rows of growth traveling between the guard plates, the end 10 of the guard plates acting to pull in the spreading vines or growth toward the roots so that the teeth operating between the rows may thoroughly and efficiently work the soil between the rows of growth and in close proximity to the roots without danger of injuring the roots. Also the vines being gathered inwardly will be moved out of the path of the teeth so that the latter will not damage or injure the growth.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a cultivator, a frame, pairs of spaced guard plates carried by said frame and provided with forwardly extending diverging portions to gather vines for movement between said guard plates, and groups of cultivating teeth carried by the frame between the pairs of guard plates, said plates extending forwardly and rearwardly beyond the groups of teeth.

2. In a cultivator, a frame, pairs of guard plates carried by said frame and having tapered diverging forward ends, rods secured to the frame and extending at right angles to the guard plates, and groups of curved spring teeth detachably secured to said rods between the pairs of guard plates, said plates extending forwardly and rearwardly beyond the groups of teeth.

3. In a cultivator, a frame, pairs of guard plates secured to said frame and having diverging forward tapered ends, means for adjustably securing the frame to said guard plates with the lower edges of the latter acting as runners, rods secured to said frame, groups of cultivating teeth secured to said rods said plates extending forwardly and rearwardly beyond the groups of teeth, a draft hitch connected to said frame, and means for adjustably mounting ground wheels on said frame.

4. In a cultivator, a frame, pairs of guard plates secured to said frame and having diverging forward tapered ends, means for adjustably securing the frame to said guard plates with the lower edges of the latter acting as runners, rods secured to said frame, groups of cultivating teeth secured to said rods said plates extending forwardly and rearwardly beyond the groups of teeth, a draft hitch connected to said frame, axles journaled on said frame and extending beyond the ends thereof with angularly disposed portions, wheels carried by said portions of the axles, operating levers secured to said axles, and releasable securing means between the levers and the frame.

ALVIN C. CROSS.